(12) United States Patent
Vik et al.

(10) Patent No.: US 10,464,419 B2
(45) Date of Patent: Nov. 5, 2019

(54) SYSTEM AND METHOD FOR AUTOMATICALLY CONTROLLING VEHICLE SPEED BASED ON TRACK-RELATED TEMPERATURES OF A WORK VEHICLE

(71) Applicant: CNH Industrial America, LLC, New Holland, PA (US)

(72) Inventors: Brian Vik, Barnesville, MN (US); Jason Novacek, West Fargo, ND (US); Mark E. Krogen, West Fargo, ND (US); David L. Tveito, West Fargo, ND (US); Russell V. Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 980 days.

(21) Appl. No.: 14/870,172

(22) Filed: Sep. 30, 2015

(65) Prior Publication Data

US 2017/0087987 A1    Mar. 30, 2017

(51) Int. Cl.
    *B60K 31/00*   (2006.01)
    *B62D 55/06*   (2006.01)
    *B60W 30/14*   (2006.01)
    *B62D 55/065*  (2006.01)
    *B60W 30/184*  (2012.01)

(52) U.S. Cl.
    CPC ........... *B60K 31/00* (2013.01); *B60W 30/146* (2013.01); *B60W 30/1846* (2013.01); *B62D 55/065* (2013.01); *B60K 2031/0091* (2013.01); *B60W 2300/44* (2013.01); *B60W 2520/10* (2013.01);

(Continued)

(58) Field of Classification Search
    None
    See application file for complete search history.

(56) References Cited

U.S. PATENT DOCUMENTS 5,410,230 A    4/1995  Bressler et al.
5,455,771 A   10/1995  Fujioka
(Continued)

FOREIGN PATENT DOCUMENTS

| EP | 1544002 | * | 6/2005 |
| EP | 3153371 | * | 9/2016 |
| WO | WO2014053322 | | 4/2014 |

OTHER PUBLICATIONS

Tire Temperature—Temperature all the race track web site. Dated Jun. 24, 2015. (4 Pages).
(Continued)

*Primary Examiner* — Colby M Hansen
(74) *Attorney, Agent, or Firm* — Rickard K. DeMille; Rebecca L. Henkel

(57) ABSTRACT

A method for automatically controlling vehicle speeds of a track-based work vehicle may generally include receiving, with a computing device, one or more signals associated with an operating temperature for a track component of a track assembly of the track-based work vehicle, comparing, with the computing device, the operating temperature for the track component to a predetermined temperature threshold defined for the track component and automatically limiting, with the computing device, a vehicle speed of the track-based work vehicle when the operating temperature for the track component exceeds the predetermined temperature threshold.

10 Claims, 4 Drawing Sheets

(52) U.S. Cl.
CPC ..... *B60W 2530/20* (2013.01); *B60W 2720/10* (2013.01); *B62D 55/06* (2013.01)

(56) References Cited

U.S. PATENT DOCUMENTS

| | | |
|---|---|---|
| 5,498,072 A | 3/1996 | Shimizu |
| 5,546,308 A | 8/1996 | Yamamoto |
| 5,557,552 A | 9/1996 | Naito et al. |
| 5,587,698 A | 12/1996 | Genna |
| 6,092,028 A | 7/2000 | Naito et al. |
| 6,313,742 B1 | 11/2001 | Larson |
| 6,456,922 B1 | 9/2002 | Gamberg |
| 6,988,026 B2 | 1/2006 | Breed et al. |
| 7,043,973 B2 | 5/2006 | Shepherd et al. |
| 7,338,201 B2 | 3/2008 | Shepherd et al. |
| 7,526,346 B2 | 4/2009 | Kolodziej |
| 8,612,066 B2 | 12/2013 | O'Neal |
| 2003/0220729 A1* | 11/2003 | Doddek ................ B60K 31/04 701/50 |

OTHER PUBLICATIONS

Friction Measurement—Friction Measurement on Road Surfaces web site. Dated Dec. 2003 (5 Pages).

* cited by examiner

SYSTEM AND METHOD FOR AUTOMATICALLY CONTROLLING VEHICLE SPEED BASED ON TRACK-RELATED TEMPERATURES OF A WORK VEHICLE

FIELD OF THE INVENTION

The present subject matter relates generally to track-driven work vehicles and, more particularly, to a system and method automatically controlling the vehicle speed of a track-driven work vehicle based on the temperature(s) of one or more of its track components.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For track driven vehicles, a track drive box or gearbox is typically rotationally coupled to the drive axle assembly for transferring the torque transmitted through the axle assembly to a drive wheel of each of the vehicle's drive track assemblies. As is generally understood, the drive wheel is rotationally engaged with a corresponding endless track such that rotation of the drive wheel rotates the track, thereby allowing the vehicle to be driven forward or backward.

The track for a track-driven work vehicle is often formed from an elastomeric material, such as rubber. While rubber-based tracks offer numerous advantages, such tracks are often subject to accelerated wear and tear due to excessive heating. For instance, heavy loads and/or high travel speeds may create hysteresis heating within a rubber track, which may cause premature aging of the underling rubber material. Such premature aging can lead to damage and/or failure of the track.

Accordingly, a system and method for controlling the vehicle speed of a track-driven work vehicle based on the operating temperature of one or more of its track components so as to prevent excessive heat generation within the vehicle's tracks would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically controlling vehicle speeds of a track-based work vehicle. The method may generally include receiving, with a computing device, one or more signals associated with an operating temperature for a track component of a track assembly of the track-based work vehicle, comparing, with the computing device, the operating temperature for the track component to a predetermined temperature threshold defined for the track component and automatically limiting, with the computing device, a vehicle speed of the track-based work vehicle when the operating temperature for the track component exceeds the predetermined temperature threshold.

In another aspect, the present subject matter is directed to a system for automatically controlling vehicle speeds of a track-based work vehicle. The system may generally include a track assembly having a track, a drive wheel configured to rotationally drive the track and at least one secondary wheel configure to engage the track. The system may also include a controller having one or more processors and associated memory. The memory may store instructions that, when implemented by the one or more processors, configure the controller to receive one or more signals associated with an operating temperature for at least one of the track or the at least one secondary wheel, compare the operating temperature to a predetermined temperature threshold defined for the at least one of the track or the at least one secondary wheel and automatically limit a vehicle speed of the track-based work vehicle when the operating temperature exceeds the predetermined temperature threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
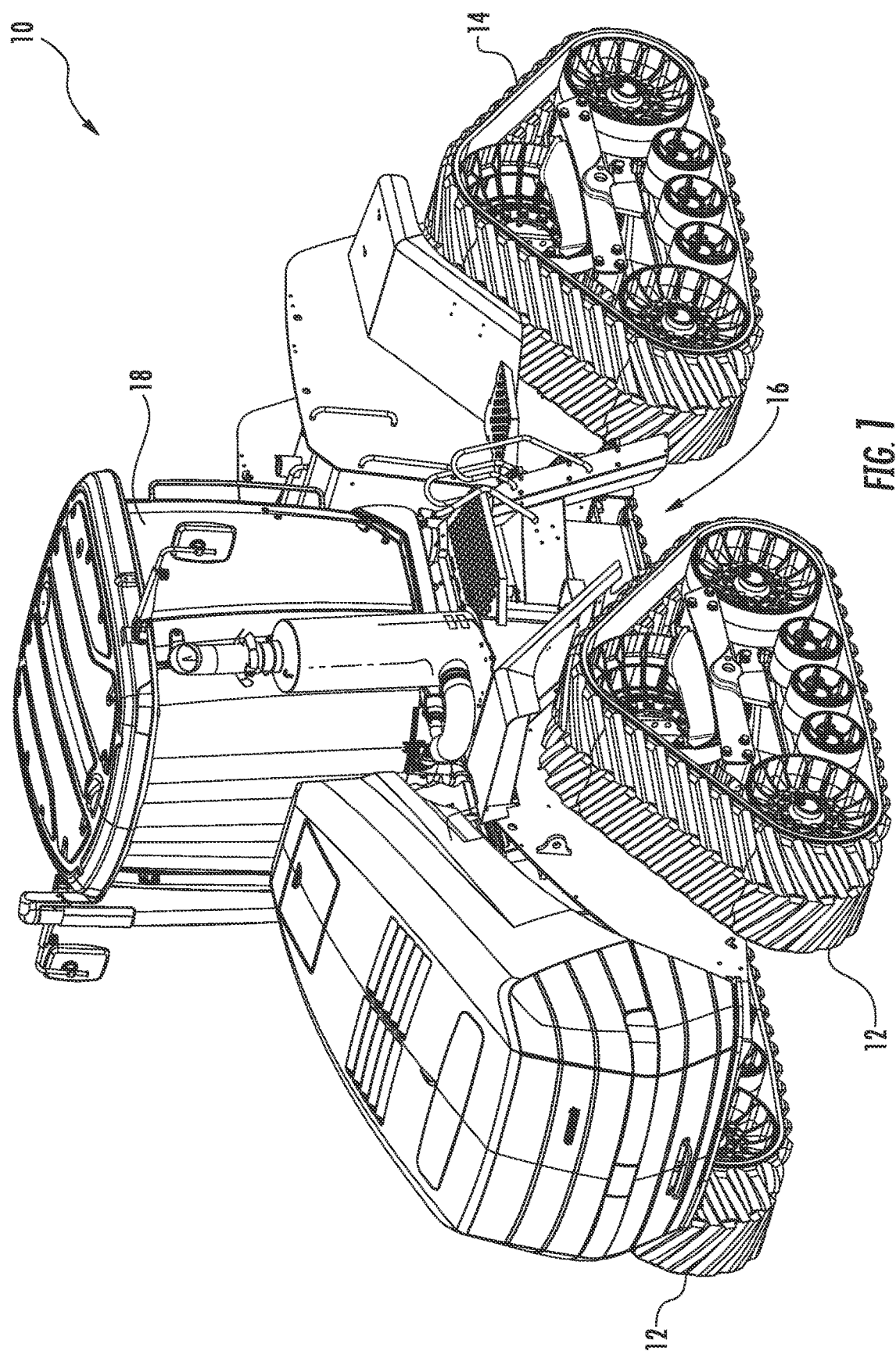
FIG. 1 illustrates a perspective view of one embodiment of a track-driven work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically controlling the vehicle speed of a track-based work vehicle based on the operating temperature(s) of one or more of the vehicle's track components. Specifically, in several embodiments, the track-based work vehicle may include a track assembly having an endless track, a drive wheel and one or more secondary wheels, such as one or more idler wheels and/or one or more roller wheels, in such embodiments, an operating temperature of one or more of such track components may be directly monitored (e.g., via a temperature sensor(s)) or indirectly monitored (e.g., by estimating the temperature based on one or more other monitored vehicle parameters). For example, in a particular embodiment, the operating temperature of the track may be directly or indirectly monitored. In another embodiment, the operating temperature of one of the other track components may be directly or indirectly monitored, which may, in turn, provide an indication of the operating temperature of the track. For instance, for many track assembly configurations, the track is compressed directly between the ground and one or more roller wheels of the track assembly. Thus, by monitoring the operating temperature of the roller wheels (e.g., by monitoring the operating temperature of the metal rim of the wheel, e.g., at the interface between the metal and the track or along the interior of the metal surface opposite the track), such operating temperature may provide an indication of the operating temperature of the track.

By monitoring the operating temperature(s) of the track component(s), controller of the track-based work vehicle may be configured to automatically control the speed of the work vehicle so as to prevent overheating of the track component(s), particularly the track. Specifically, in several embodiments, the operating temperature(s) of the track component(s) may be compared to a predetermined temperature threshold, such as a temperature threshold associated with a temperature at which the vehicle speed may need to be reduced or limited to prevent overheating of the track. In such embodiments, when it is determined that the operating temperature(s) of the track component(s) exceeds the predetermined temperature threshold, the controller may be configured to automatically limit the vehicle speed of the track-based work vehicle. For instance, the controller may set a maximum speed limit for the work vehicle based on the current operating temperature(s) of the track component(s). The controller may then control the operation if the work vehicle (e.g., by controlling the operation of the transmission and/or the engine) such that the ground speed of the work vehicle does not exceed the maximum speed limit set by the controller.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. As will be described below with reference to FIG. 3, the work vehicle 10 may also include a drivetrain including an engine, a transmission and a drive axle assembly supported by the chassis 16 and in mechanical communication with one or more of the front track assemblies 12 and/or the rear track assemblies 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like. Similarly, in another alternative embodiment, as opposed to having four track assemblies 12,14, the work vehicle 10 may only include two track assemblies. For instance, the work vehicle 10 may include a first track assembly positioned along one side of the vehicle 10 and a second track assembly positioned along the other side of the vehicle 10.

Figure 2:
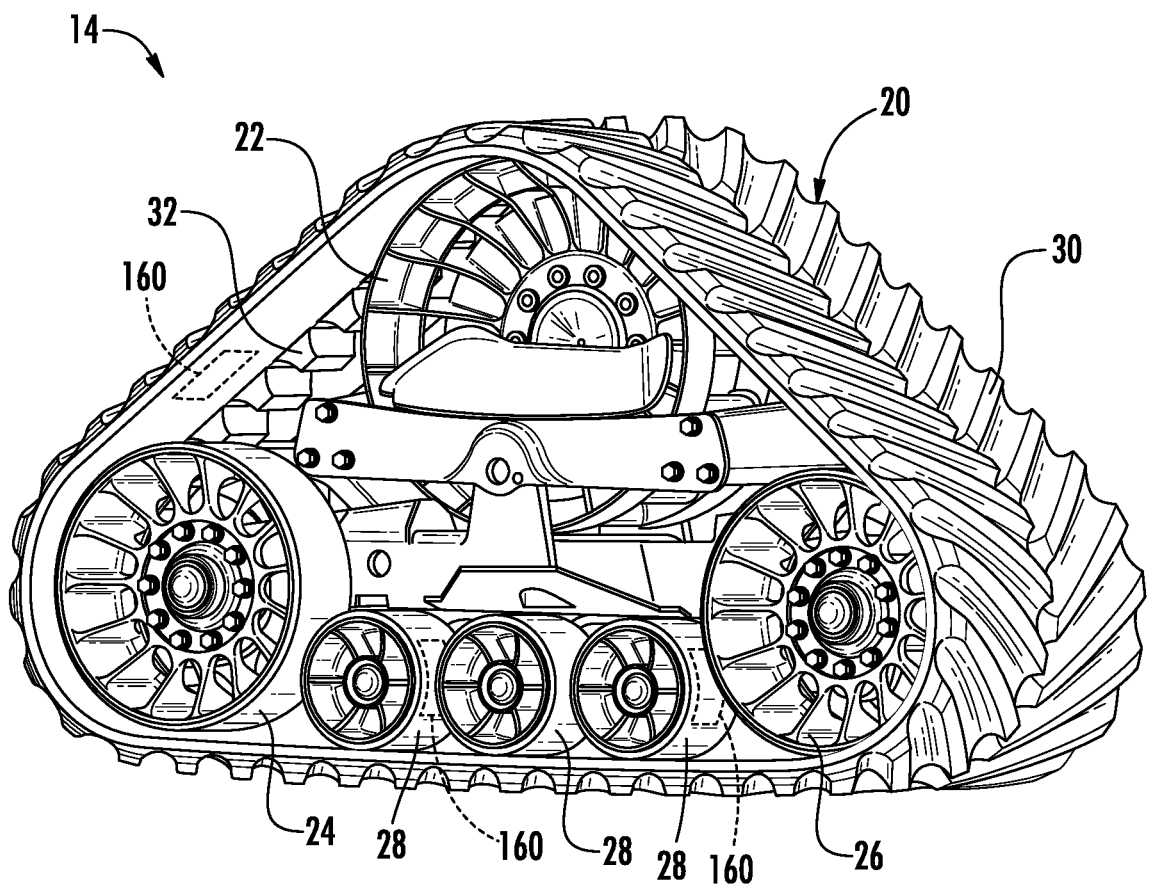
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the rear track assemblies 14 shown in FIG. 1 is illustrated in accordance with aspects of the present subject matter. As shown, the track assembly 14 may generally include a track 20 and a drive wheel 22 for driving the track 20. As will be described below, the drive wheel 22 may be in mechanical communication with the drivetrain of the work vehicle 10 via a track drive box that houses one or more drive components (e.g., one or more suitable gears) for transferring rotational energy from the drivetrain to the drive wheel 22. In addition, the track assembly 14 may include one or more secondary wheels, such as a front idler wheel 24, a rear idler wheel 26 and a plurality of roller wheels 28 positioned between the idler wheels 24, 26 so as to engage the portions of the track 20 contacting the ground.

As shown in FIG. 2, the track 20 corresponds to an endless or continuously looped track including a plural of treads 30 defining a tread pattern along on an outer surface of the track 20. In general, the track 20 may be comprised of any suitable material and may define any suitable tread pattern. For example, in several embodiments, the track 20 may be formed at least partially from an elastomeric material, such as a rubber material or a steel-reinforced rubber material. The treads 30 may be formed integrally with the track 20 or may be separately attached to the track 20, such as by chemically bonding the treads 30 to the track 20. Additionally, as shown in FIG. 2, the track 20 may include a plurality of longitudinally spaced drive lugs 32 extending radially inwardly from an inner surface of the track 20. As is generally understood, the drive lugs 32 may be configured to be mechanically engaged by the drive wheel 22 such that, as the drive wheel 22 is rotated, the track 20 rotates around the endless loop in order to drive the work vehicle 10.

It should be appreciated that the track assembly 14 shown in FIG. 2 is simply illustrated to provide one example of a suitable track assembly configuration. In other embodiments, the track assembly 14 may have any other suitable track-based configuration, including having any other suitable number of secondary wheels, such as any number of idler wheels 24, 26 and/or roller wheels 28, with such wheel(s) 24, 26, 28 being positioned at any suitable location(s) relative to the drive wheel 22. Additionally, the track assembly 14 may generally define any other suitable shape. For instance, in the illustrated embodiment, the track assembly 14 generally defines a triangular shape with rounded edges. In other embodiments, the track assembly 14 may define more of an elliptical shape or a rectangular shape with rounded edges.

Figure 3:
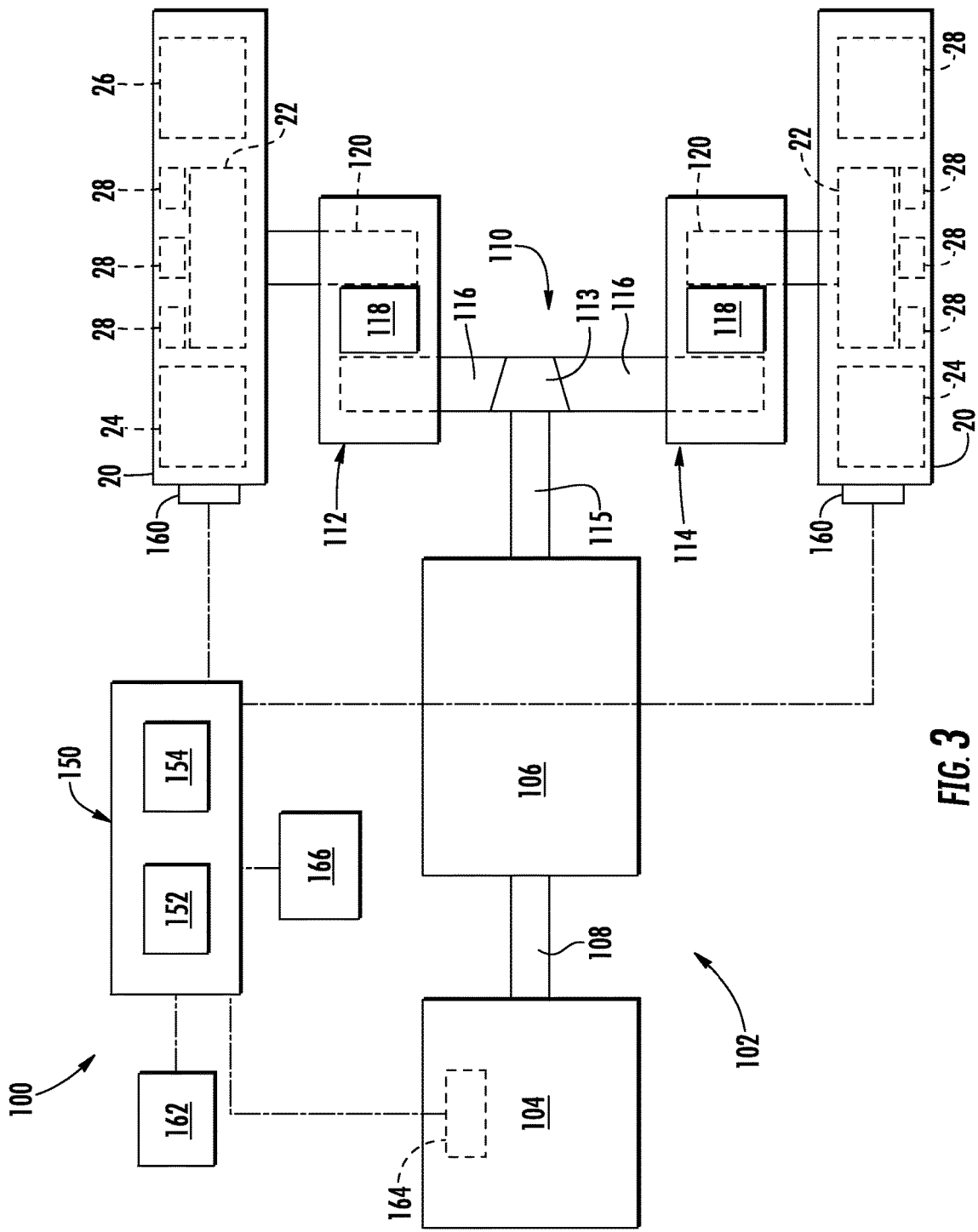
FIG. 3 illustrates a schematic view of one embodiment of a system for automatically controlling the vehicle speed of a track-based work vehicle based on the operating temperature(s) of one or more of the vehicle's track components in accordance with aspects of the present subject matter.

Referring now to FIG. 3, a schematic view of one embodiment of a system 100 for automatically controlling the vehicle speed of a track-based work vehicle 10 is illustrated in accordance with aspects of the present subject matter. As shown, the system 100 may generally include one or more of the track assemblies 12, 14 described above and a drivetrain 102 suitable for transferring power to the track 20 of each track assembly so as to drive the work vehicle 10, in general, the drivetrain 102 may include an engine 104 and a transmission 106 configured to be mounted on the chassis 16 (FIG. 1) of the work vehicle 10. The transmission 106 may be operably coupled to the engine 104 via one or more shafts 108 and may be configured to provide variably adjusted gear ratios for transferring engine power to the drive wheels 22 via a drive axle assembly 110 and separate track drive boxes 112, 114. As shown, the drive axle assembly 110 may include a differential 113 coupled to an output shaft 115 of the transmission 106 and one or more axle shafts 116 coupled to the differential 113 for transferring power to the respective track drive boxes 112, 114.

In general, each track drive box 112, 114 may correspond to a self-contained gearbox for transferring power between the axle shaft(s) 116 and the drive wheels 22. Thus, as shown, each drive box 112, 114 may include one or more gears 118 configured to rotatably couple the axle shaft(s) 116 to an output shaft 120 for driving the drive wheel 22 of the corresponding track assembly. As such, rotational motion of the axle shaft(s) 116 may be transferred to the respective output shafts 120 of the first and second track drive boxes 112, 114 via the internal gear(s) 118 in order to rotationally drive the drive wheels 22. As indicated above, each drive wheel 22 may be configured to engage its corresponding track 20 for rotating the track around the endless loop defined by the drive wheel 22 and the corresponding secondary wheels, such as the idler wheels 24, 26 and the roller wheels 28.

Additionally, as shown in FIG. 3, the system 100 may also include a controller 150 configured to automatically control the operation of the track-based work vehicle 10, such as by automatically limiting the vehicle speed of the work vehicle 10 based on the operating temperature(s) of one or more of the track component(s) of the track assemblies 12, 14 and/or by automatically controlling the operation of the engine 104 and/or the transmission 106. In general, the controller 150 may correspond to any suitable processor-based device known in the art, such as any suitable computing device and/or any combination of computing devices. Thus, in several embodiments, the controller 150 may include one or more processor(s) 152 and associated memory 154 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 154 of the controller 150 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto optical disk (MOD), a digital versatile disc (PAID) and/or other suitable memory elements. Such memory 154 may generally be configured to store suitable computer readable instructions that, when executed by the processor(s) 152, configure the controller 150 to perform various computer-implemented functions, such as the methods described herein. In addition, the controller 150 may also include various other suitable components, such as a communications circuit or module, one or more input/output channels, a data/control bus and/or the like.

It should be appreciated that the controller 150 may correspond to an existing controller of the work vehicle 10 or the controller 150 may correspond to a separate processing device. For instance, in one embodiment, the controller 150 may form all or part of a separate plug-in module that may be installed within the work vehicle 10 to allow for the disclosed system and method to be implemented without requiring additional software to be uploaded onto existing control devices of the vehicle 10.

In several embodiments, the controller 150 may be configured to monitor one or more vehicle parameters impacting the operating temperature of one or more of the track components of the track assemblies 12, 14. For instance, in one embodiment, the controller 150 may be configured to directly monitor the operating temperature of one or more of the track components, such as the operating temperature of the track 20 and/or the operating temperature of one or more of the roller wheels 28. In such an embodiment, the controller 150 may be communicatively coupled to one or more temperature sensors 160 for monitoring the operating temperature(s) of the track component(s). For example, as shown in FIG. 3, a temperature sensor(s) 160 may be provided in operative association with the track component(s) to allow the operating temperature(s) of such component(s) to be continuously monitored. For instance, referring back to FIG. 2, a temperature sensor(s) 160 may be provided in operative association with the track. 20 and/or one or more of the roller wheels 28.

It should be appreciated that the temperature sensor(s) 160 may generally correspond to any suitable sensor(s) known in the art that is configured to monitor the temperature of a component. For instance, suitable temperatures sensors may include, but are not limited to, thermocouples, thermometers, thermistors, resistance temperature detectors, fiber optic temperature sensors, semiconductor temperature sensors, pyrometers, thermal imagers and/or the like.

As an alternative to directly monitoring the operating temperature(s) of the track component(s), the controller 150 may be configured to estimate or predict the operating temperature(s) of the track component(s) based on one or more other vehicle parameters that provide an indication of the track operating temperature(s). For instance, in one embodiment, the controller 150 may be configured to monitor the load acting on each track 20, the current vehicle speed and the time at which the vehicle 10 is operating at the current vehicle speed. Based on such monitored vehicle parameters, the controller 150 may then predict the operating temperature(s) of one or more of the track components.

In several embodiments, the controller 150 may be configured to predict the operating temperature(s) of the track component(s) based on a suitable mathematic model stored within the controller's memory 154. For example, experimental temperature data for the track component(s) may be obtained by performing experiments in which the track loads and/or the number of compression cycles experienced at a given vehicle speed (with the number of compression cycles being determined as a function of the vehicle speed and the time at which the vehicle is maintained at such speed) are varied. Based on such experimental temperature data, a model(s) may be developed that predicts the operating temperature(s) for the track component(s) as a function of the track load and the number of compression cycles experienced at a given vehicle speed. As such, by monitoring the current load acting on each track 20, the current vehicle speed and the time at which the vehicle 10 is operating at the current vehicle speed, the controller 150 may utilize the mathematical model(s) to estimate or predict the operating temperature(s) of the track component(s).

It should be appreciated that the controller 150 may be configured to monitor the vehicle speed using any suitable speed sensing means and/or methodology known in the art. For instance, in one embodiment, the controller 150 may be communicatively coupled to a vehicle speed sensor 162 configured to directly monitor the vehicle's speed, such as by providing a vehicle speed sensor(s) in operative association with one of the track assemblies 12, 14 or by using any other suitable vehicle speed sensor (e.g., a GPS device configured to monitor the vehicle's speed). Alternatively, the controller 150 may be communicatively coupled to any other sensor that provides an indication of the current vehicle speed. For instance, in an alternative embodiment, the controller 150 may be coupled to an engine speed sensor 164 configured to monitor the output speed of the engine 104. In such an embodiment, by knowing the current output speed of the engine 104 as well as the current gear ratio of the transmission 106, the controller 150 may be configured to calculate the current vehicle speed.

It should also be appreciated that the controller 150 may be configured to monitor the load acting on the track(s) 20 using any suitable load sensing means and/or methodology known in the art. For instance, in several embodiments, the controller 150 may be coupled to one or more load sensors 166 configured to monitor the loads acting on the track(s) 20. In general, the load sensor(s) 166 may correspond to any suitable sensor(s) configure to measure any force indicative of the load(s) acting on the track(s) 20 (e.g., pressure forces acting on the track(s) due to the weight of the vehicle 10). Thus, for example, the load sensor(s) 166 may be one or more pressure sensors, strain gauges, load cells and/or any other suitable load sensor(s) known in the art. The load sensor(s) 166 may generally be placed at any suitable location on or within the vehicle 10 that allows the controller 150 to determine the loads acting the track(s) 20, such as on or within a track component(s) of one or more of the track assemblies 12, 14 or at any other suitable location(s) on or within the vehicle 10.

Additionally, in several embodiments, the controller 150 may be configured to automatically limit the vehicle speed of the track-based work vehicle 10 based on the measured and/or predicted operating temperature(s) of the track component(s). For example, in one embodiment, the controller 150 may be configured to compare the operating temperature(s) of the track component(s) to a predetermined temperature threshold defined for such component(s). In the event that the operating temperature(s) exceeds the predetermined temperature threshold, the controller 150 may be configured to limit the vehicle speed for the work vehicle 10 to a maximum speed limit in an attempt to prevent damage to the tracks 20 due to overheating. In such instance, if the work vehicle 10 is currently operating at a vehicle speed that exceeds the maximum speed limit, the controller 150 may be configured to automatically reduce the vehicle speed to a speed at or below the maximum speed limiting, such as by automatically downshifting the transmission 106 and/or by automatically adjusting the output speed of the engine 104. Similarly, if the operator commands a vehicle speed that exceeds the maximum speed limit, the controller 150 may be configured to automatically control the operation of the transmission 106 and/or the engine 104 such that the vehicle speed does not exceed the maximum speed limit, such as by limiting the operation of the transmission 106 and/or the engine 104 such that the vehicle speed is only increased to a level at or below the maximum speed limit.

In a particular embodiment of the present subject matter, the controller 150 may be configured to monitor the operating temperature(s) of the track component(s) relative to various different predetermined temperature thresholds. For instance, the controller 150 may be configured to monitor the operating temperature(s) relative to a first temperature threshold, a second temperature threshold, a third temperature threshold and a fourth temperature threshold, with the second temperature threshold being greater than the first temperature threshold, the third temperature threshold being greater than the first and second temperature thresholds and the fourth temperature threshold being greater than the first, second and third temperature thresholds. In such an embodiment, each temperature threshold may be associated with a differing maximum speed limit. For instance, in the event that the operating temperature(s) of the track component(s) exceeds the first temperature threshold, the controller 150 may be configured to automatically limit the vehicle speed to less than a first maximum speed limit (e.g., less than 40 kilometers-per-hour (KPH)). However, if the operating temperature(s) continues to increase and exceeds the second temperature threshold, the controller 150 may be configured to automatically limit the vehicle speed to less than a second maximum speed limit (e.g., less than 35 KPH). Similarly, if the operating temperature(s) continues to increase and exceeds the third temperature threshold, the controller 150 may be configured to automatically limit the vehicle speed to less than a third maximum speed limit (e.g., less than 30 KPH). Moreover, if the operating temperature(s) continues to increase and exceeds the fourth temperature threshold, the controller 150 may be configured to automatically limit the vehicle speed to less than a fourth maximum speed limit (e.g., less than 25 KPH).

It should also be appreciated that, as an alternative to decreasing the maximum speed limit for the work vehicle 10 based on increasing temperature thresholds, the controller 150 may, instead, be configured to reduce the maximum speed limit based on the total amount of time that the operating temperature(s) has exceeded a given predetermined temperature threshold. For instance, when the operating temperature(s) of the track component(s) initially exceeds the predetermined temperature threshold, the controller 150 may be configured to automatically limit the vehicle speed to less than a first maximum speed limit (e.g., less than 40 KPH). Thereafter, if the operating temperature(s) is maintained above the predetermined temperature threshold for a given period of time (e.g., one hour), the controller 150 may be configured to automatically limit the vehicle speed to less than a second maximum speed limit (e.g., less than 35 KPH). Similarly, if the operating temperature(s) is maintained above the predetermined temperature threshold for an even longer period of time (e.g., two hours), the controller 150 may be configured to automatically limit the vehicle speed to less than a third maximum speed limit (e.g., less than 30 KPH). Such a methodology may be continued by incrementally the decreasing the maximum speed limit for the work vehicle 10 as the operating temperature(s) is maintained above the predetermined temperature threshold for even longer periods of time.

Additionally, in several embodiments, the controller 150 may be configured to provide an operator of the work vehicle 10 with a notification that the operating temperature(s) of the track component(s) has exceeded a given threshold or has otherwise increased to a level that could potentially cause damage to the track(s) 20. For instance, in a particular embodiment, the controller 150 may be configured to notify the operator when the operating temperature(s) of the track component(s) exceeds an initial temperature threshold defined for such track component(s) that is below the predetermined temperature threshold at which the controller 150 is configured to automatically limit the vehicle's speed. In such an embodiment, when the operating temperature(s) exceeds the initial temperature threshold, the controller 150 may transmit a suitable control signal to a vehicle component located within the operator's cab 18 (FIG. 1) so as to provide the operator with a suitable notification associated with the operating temperature(s) of the track component(s). For instance, the controller 150 may be configured to provide a visual notification by transmitting a control signal(s) to a display panel, light and/or other any other suitable component located within the cab 18 that is configured to provide a visual notification to the operator. Similarly, in addition to the visual notification or as an alternative thereto, the controller 150 may be configured to provide an audible notification by transmitting a control signal(s) to a speaker and/or other any other suitable component located within the cab 18 that is configured to provide an audible notification to the operator.

Figure 4:
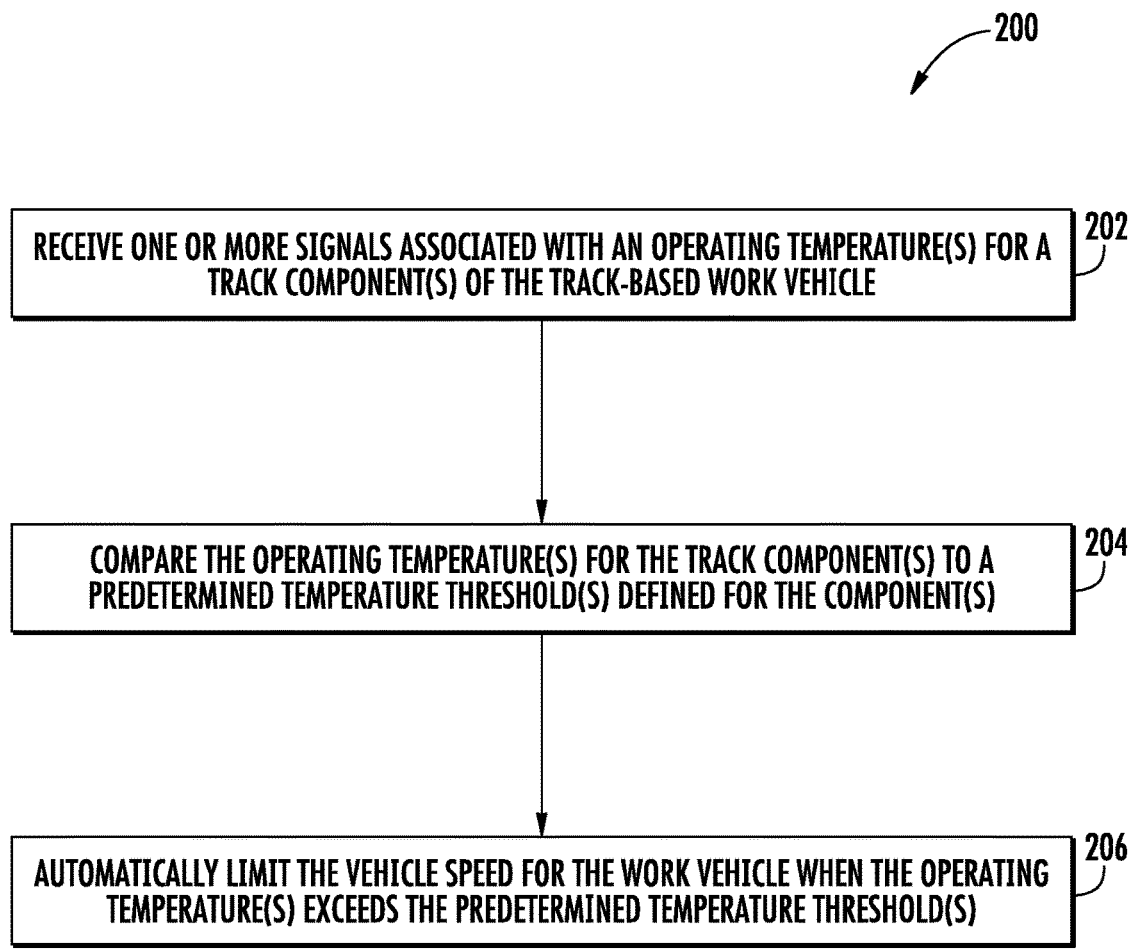
FIG. 4 illustrates a flow diagram of one embodiment of a method for automatically controlling the vehicle speed of a track-based work vehicle based on the operating temperature (s) of one or more of the vehicle's track components in accordance with aspects of the present subject matter.

Referring now to FIG. 4, a flow diagram of one embodiment of a method 200 for automatically controlling the vehicle speed of a track-based work vehicle 10 is illustrated in accordance with aspects of the present subject matter. In general, the method 200 will be described herein with reference to the system 100 described above with reference to FIG. 3. However, it should be appreciated by those of ordinary skill in the art that the disclosed method 200 may also be implemented within any other suitable system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving one or more signals associated with an operating temperature(s) for a track component(s) of the track-based work vehicle. For example, as indicated above, the controller 150 may be configured to receive signals associated with the operating temperature(s) of one or more of the track components, such as signals from one or more temperature sensors 160 configured to directly monitor the operating temperature(s) and/or signals associated with one or more other vehicle parameters that provide an indication of the operating temperature(s) (e.g., signals related to the track load, the vehicle speed and/or the time at which the vehicle 10 has been moving at the current speed).

Additionally, as (204), the method 200 may include comparing the operating temperature(s) for the track component(s) to a predetermined temperature threshold(s) defined for the component(s). Specifically, as indicated above, the controller 150 may be configured to compare the monitored temperature(s) to any number of predetermined temperature thresholds. For instance, the controller 150 may compare the monitored temperature(s) to an initial temperature threshold associated with providing a notification to the operating regarding the temperature(s) of the track component(s). In addition, the controller 150 may compare the monitored temperature(s) to one or more other temperature thresholds associated with limiting the vehicle speed of the work vehicle 10.

Moreover, at (206), the method 200 may include automatically limiting the vehicle speed for the work vehicle when the operating temperature(s) exceeds the predetermined temperature threshold(s). Specifically, in several embodiments, the controller 150 may be configured to automatically limit the vehicle speed to a maximum speed limit when the operating temperature(s) exceeds the predetermined temperature threshold(s). Thereafter, the controller 150 may control the operation of the vehicle's engine 104 and/or transmission 106 to ensure that the vehicle speed is maintained at or below the maximum speed limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for automatically controlling vehicle speeds of a track-based work vehicle, the system comprising:
    a track assembly including a track, a drive wheel configured to rotationally drive the track and at least one secondary wheel configured to engage the track;
    a controller including one or more processors and associated memory, the memory storing instructions that, when implemented by the one or more processors, configure the controller to:
        receive one or more signals associated with an operating temperature for at least one of the track or the at least one secondary wheel;
        compare the operating temperature to a predetermined temperature threshold defined for the at least one of the track or the at least one secondary wheel; and
        automatically limit a vehicle speed of the track-based work vehicle when the operating temperature exceeds the predetermined temperature threshold.

2. The system of claim 1, wherein the at least one secondary wheel corresponds to a roller wheel of the track assembly.

3. The system of claim 1, further comprising a temperature sensor configured to monitor the operating temperature for the at least one of the track or the at least one secondary wheel, the controller being configured to receive the one or more signals from the temperature sensor.

4. The system of claim 1, wherein the one or more signals are associated with one or more monitored vehicle parameters that provide an indication of the operating temperature for the at least one of the track or the at least one secondary wheel, wherein the controller is further configured to predict the operating temperature for the at least one of the track or the at least one secondary wheel based on the one or more monitored vehicle parameters.

5. The system of claim 4, wherein the one or more monitored vehicle parameters are associated with a load on the track, a current vehicle speed for the track-based work vehicle and a time at which the track-based work vehicle has been operating at the current vehicle speed.

6. The system of claim 1, wherein the controller is configured to automatically downshift a transmission of the track-based work vehicle or automatically adjust an output speed of an engine of the track-based work vehicle when the operating temperature for the track component exceeds the predetermined temperature threshold.

7. The system of claim 1, wherein the controller is configured to automatically limit the vehicle speed of the track-based work vehicle to a first maximum speed limit when the operating temperature exceeds the predetermined temperature threshold.

8. The system of claim 7, wherein the controller is further configured to:
   determine that the operating temperature for the track component has exceeded the predetermined temperature threshold for a given period of time; and
   automatically limit the vehicle speed of the track-based work vehicle to a second maximum speed limit, wherein the second maximum speed limit is less than the first maximum speed limit.

9. The system of claim 7, wherein the predetermined temperature threshold corresponds to a first predetermined temperature threshold, wherein the controller is further configured to:
   compare the operating temperature to a second predetermined temperature threshold defined for the at least one of the track or the at least one secondary wheel, wherein the second predetermined temperature threshold is greater than the first predetermined temperature threshold; and
   automatically limit the vehicle speed of the track-based work vehicle to a second maximum speed limit when the operating temperature exceeds the second predetermined temperature threshold, wherein the second maximum speed limit is less than the first maximum speed limit.

10. The system of claim 1, wherein the controller is further configured to provide a notification to an operator of the track-based work vehicle when the operating temperature exceeds an initial predetermined temperature threshold, the initial predetermined temperature threshold being less than the predetermined temperature threshold.

* * * * *